Patented June 30, 1953

2,643,759

UNITED STATES PATENT OFFICE 2,643,759

CONVEYER FOR CORN HARVESTERS

Melvin L. Swanson, Mission, S. Dak.

Application January 24, 1949, Serial No. 72,307

6 Claims. (Cl. 198—44)

This invention relates to the harvesting of corn and more particularly it is an object of the invention to provide a conveyor for facilitating the delivery of corn from the receiving hopper portion of the corn harvester to the rearward travelling inclined conveyor.

In corn harvesters of the prior art it has been the experience that at times when ears of corn are delivered from the corn picking rolls to the forward hopper prior to delivery to the rearwardly inclined conveyor, the ears of corn frequently become clogged and move very slowly if at all from the hopper to the inclined conveyor.

It is therefore an object of this invention to eliminate these disadvantages of the prior art.

A further object of the invention is to provide a conveying device for facilitating the delivery of corn from the forward receiving hopper of the corn harvester to the upwardly inclined rearward conveyor thereof.

A further object of the invention resides in the provision of a conveying device employing paddle motion for effectively delivering corn to the rearward conveyor with a minimum of power input in proportion to results achieved.

A further object of the invention is to provide a conveying device as described which is of simple and inexpensive construction and which can be secured to most types of corn pickers.

Still another object of the invention is to provide a conveying device as described having paddle members of relatively small thickness so as to work through piles of corn ears with a minimum of resistance for facilitating this operation and for providing maximum durability.

A further object of the invention resides in the provision of a conveying device as described which can be driven from the lower pulley shaft of the rearwardly inclined conveyor of the corn harvester.

Another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof.

Figures 3, 4:
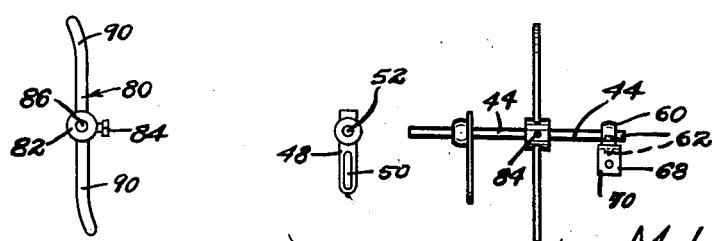
Figure 3 is a side elevation of the blade portion of the device.

Figure 4 is a combined view showing at the left an adjustable fitting having an integral bearing portion for securing a shaft of the conveying device to a side of the corn harvester bin; at the right hand side of the view of Figure 4, the conveying device assembly is shown with the adjustable bearing fitting at the left on the supporting shaft thereof, the paddle member shown in the center, and an opposite bearing shown at the right and attached to a supporting bar of the invention.

Figure 1:
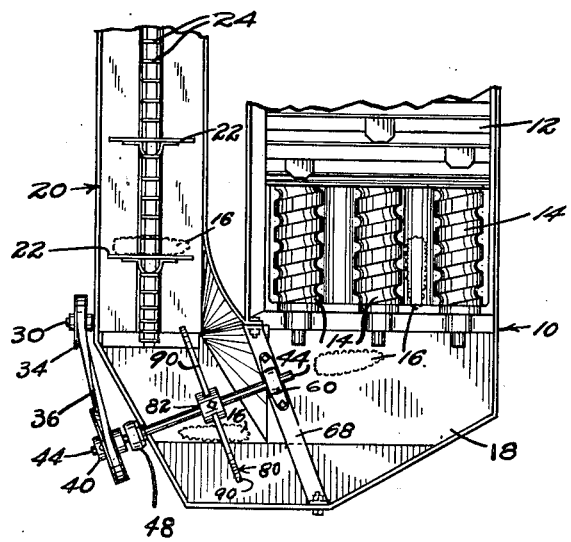
Figure 1 is a top plan view of the hopper portion of a corn harvester showing the conveyor of this invention attached thereto, rearward portions of the corn harvester not being shown.
Figure 2:
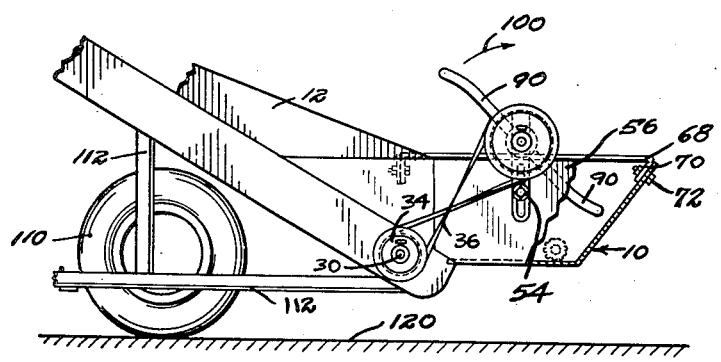
Figure 2 is a side elevation of the parts shown in Figure 1 and also showing a supporting wheel of the corn harvester, a side portion of the corn harvester hopper being broken away for diagrammatically showing the corn conveying device of this invention in operative position, an ear of corn being diagrammatically shown in a position for being moved rearwardly by the conveying device.

The conveying device of this invention is for attachment to a corn harvester of the conventional type, such as is generally indicated at 10 in Figures 1 and 2.

Such corn harvesters include a forward traveling conveyor 12 for delivering ears of corn to husking rolls 14 of the auger type. Such husking rolls are disposed in spaced apart positions and mounted in bearings on the corn harvester.

The ears of corn 16 are delivered in operation from the auger 14 forwardly to a hopper 18 which also functions as a chute for delivering ears of corn 16 to the lower end of an upwardly and rearwardly extending conveyor generally indicated at 20. The conveyor 20 is provided with flights 22 interconnected by a belt or chain 24.

The lower end of the conveyor 20 is provided with a lower pulley shaft 30, a portion of which extends outwardly of the sides thereof. In accordance with the present invention a pulley 34 is secured to the shaft 30 and a belt 36 is disposed for drivably securing a pulley 40 to the pulley 34. The pulley 40 is disposed forwardly of the pulley 34 and is mounted on a shaft 44 of the invention, the shaft 44 being itself mounted at one end on a suitable bearing member 48.

The bearing member 48 is best shown in Figure 4 and includes an elongated main body portion having a longitudinally disposed slot therein for the reception of a bolt 54 as best seen in Figure 2. The bolt 54 is adapted to secure the member 48 to a side wall 56 of the bin or hopper 18. Adjustment of the bolts 54 in different positions in the slot 50 will cause the shaft 44, which is rotatably mounted in an aperture 52 in an upper bearing end of the fitting 48, to be disposed upwardly or downwardly with respect to the bottom of the bin 18.

The shaft 44 extends inwardly of the bin 18 and is mounted at its other end in a suitable bearing 60 which is secured by bolts 62 to a supporting bar 68 of the invention.

The supporting bar 68 is elongated and is provided with transversely disposed downwardly extending flanges 70 at its ends. The flanges 70 are each provided with apertures for the reception of bolts 72. The bolts 72 are for the purpose of securing the bar 68 to the bin 18.

Opposite ends of the bar 68 are disposed secured to the rearward and forward sides of the bin or hopper 18 and the bearing 60 is mounted on the bar 68 in such maner that the shaft 44 is transversely disposed with respect to a direction extending toward the conveyor 20 from an adjacent forward portion of the hopper 18.

In the middle of the shaft 44 a paddle device 80 of the invention is provided. The paddle device 80 is provided with a hub 82 having a set screw 84 for securing the same rigidly to the shaft 44. Outwardly extending from the hub 82 and on opposite sides thereof, and in directions transversely disposed and at a right angle with respect to the center bore 86 of the hub 82, two oppositely disposed paddle blades 90 are provided as best shown in Figure 2.

The paddle blades 90 have outer ends inclinedly disposed with respect to inner ends thereof. The inclination of the outer ends of the paddle 90 is to the rearward with respect to the direction of rotation of the paddle as the latter is indicated by the arrow 100 in Figure 2.

In operation, it will be seen that as corn is delivered forwardly from the roller 14 to the hopper 18, the corn 16 will be urged rearwardly toward the conveyor 20 by the paddles 90 as they rotate in the direction of the arrow 100.

It will be seen that the plane in which the paddles 90 travel is positioned at an acute angle in relation to the conveyor 20 and the blades are radially disposed and provided with arcuate outer ends.

The conveyor 20 is mounted upon suitable wheels 110 by means of framework members 112 and as it travels over the ground 120, as shown in Figure 2, the corn will be urged rearwardly by the device 80 toward the conveyor 20 eliminating clogging and making possible a more rapid and less interrupted transit across fields being harvested.

From the foregoing description it is thought to be obvious that a conveyor for corn harvesters constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as claimed.

I claim:

1. In a conveying device for corn harvesters, the combination which comprises a feeder conveyor adapted to travel forwardly, a substantially horizontally disposed hopper, U-shape in plan positioned to receive products from the conveyor adapted to travel forwardly, a rearwardly extended upwardly inclined receiving conveyor positioned parallel to said feeder conveyor and adapted to receive products from said hopper, a shaft rotatably mounted on said hopper, a rotatable paddle member having oppositely extending blades carried by said shaft, the extended ends of said blades being inclined rearwardly with respect to the direction of rotation of said paddle member, and means for operatively connecting said shaft to a transmission member of a corn harvester on which the device is positioned for rotating said paddle member to move corn from the hopper to said rearwardly extended conveyor upon passage of said blades across the hopper, said blades being disposed for rotation in a vertical plane positioned at an acute angle in relation to the longitudinal center of said rearwardly extended conveyor.

2. In a conveying device for corn harvesters, the combination which comprises a feeder conveyor adapted to travel forwardly, a substantially horizontally disposed hopper, U-shape in plan, positioned to receive products from the conveyor adapted to travel forwardly, a rearwardly extended upwardly inclined receiving conveyor positioned parallel to said feeder conveyor and adapted to receive products from said hopper, a rotatable paddle member having two oppositely extending paddle portions, said paddle portions each having an outer end inclined rearwardly with respect to the inner end thereof and with respect to a direction of rotation in use, means for rotatably mounting said paddle member in a position for rotation to urge ears of corn in said hoper toward said rearwardly extended conveyor, and means for causing said paddle members to rotate in a direction for causing said ears of corn to move towards the rearwardly extended conveyor.

3. In a conveying device for corn harvesters, the combination which comprises a feeder conveyor adapted to travel forwardly, a substantially horizontally disposed hopper, U-shape in plan, positioned to receive products from said conveyor that is adapted to travel forwardly, a rearwardly extended upwardly inclined receiving conveyor positioned parallel to said feeder conveyor and adapted to receive products from said hopper, a rotatable paddle member having two oppositely extending paddle portions, means for rotatably mounting said paddle member in a position for rotation to urge ears of corn in said hopper towards said rearwardly extended conveyor, and means for causing said paddle members to rotate in a direction for causing said ears of corn to move towards said rearwardly extended conveyor.

4. In a conveying device for corn harvesters, the combination which comprises a feeder conveyor adapted to travel forwardly, a substantially horizontally disposed hopper, U-shape in plan, positioned to receive products from the feeder conveyor, a rearwardly extended upwardly inclined receiving conveyor positioned parallel to said feeder conveyor and adapted to receive products from said hopper, said conveying device comprising a rotatable paddle member, means for rotatably mounting said paddle member in a position for rotation to urge ears of corn in said hopper towards said rearwardly extended conveyor, and means for causing said paddle members to rotate in a direction for causing said ears of corn to move towards the rearwardly extended conveyor.

5. A connecting end feed hopper for conveyors comprising a forwardly traveling feeder conveyor, a rearwardly extending upwardly inclined receiving conveyor positioned parallel to the feeder conveyor, an open top horizontally disposed container U-shape in plan mounted with one side positioned to receive products from the feeder conveyor and the other side positioned to deliver products to said receiving conveyor, a pair of paddle blades positioned to extend into said container, means mounting said paddle blades for rotary movement in the discharge side of said container, and means rotating said paddle blades for urging products in the said container to said receiving conveyor.

6. In a connecting end feeder for a pair of conveyors, the combination which comprises a forwardly traveling feeder conveyor, a rearwardly extending upwardly inclined receiving conveyor positioned parallel to the feeder conveyor, a horizontally disposed open top hopper U-shape in plan and positioned with one side in communication with the feeder conveyor and the other in communication with the receiving conveyor, the intermediate part of said hopper having diagonally disposed vertically positioned walls at the corners and the outer part of the lower surface sloping downwardly toward the center of the hopper, a bearing positioned on a bar extended across the intermediate part of the hopper, a coacting bearing adjustably mounted on the diagonally disposed wall on the side of the hopper corresponding with the receiving conveyor, a shaft journaled in said bearings, a plurality of radially disposed blades carried by said shaft, said shaft diagonally disposed in the hopper with the said blades positioned to feed products in the hopper from the intermediate part thereof toward the said receiving conveyor, and driving means for rotating the shaft from a rotating part of said receiving conveyor.

MELVIN L. SWANSON.

References Cited in the file of this patent

UNITED STATES PATENTS

| Number | Name | Date |
|---|---|---|
| 219,871 | Olin | Sept. 23, 1879 |
| 363,867 | Weaver | May 31, 1887 |
| 552,038 | Bunnell | Dec. 24, 1895 |
| 1,902,292 | Reynolds | Mar. 21, 1933 |
| 2,045,081 | Hart | June 23, 1936 |
| 2,267,303 | Jordan | Dec. 23, 1941 |
| 2,463,061 | Small | Mar. 1, 1949 |

FOREIGN PATENTS

| Number | Country | Date |
|---|---|---|
| 496,152 | Germany | Apr. 16, 1930 |
| 512,397 | Germany | Nov. 11, 1930 |
| 513,590 | Germany | Dec. 1, 1930 |